(12) United States Patent
Gintis et al.

(10) Patent No.: US 10,917,326 B1
(45) Date of Patent: Feb. 9, 2021

(54) METHODS, SYSTEMS, AND COMPUTER READABLE MEDIA FOR DEBUGGING TEST TRAFFIC GENERATION

(71) Applicant: Keysight Technologies, Inc., Santa Rosa, CA (US)

(72) Inventors: Noah Steven Gintis, Westlake Village, CA (US); Alina Crina Balan, Camarillo, CA (US); Vinod Joseph, Thousand Oaks, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/549,874

(22) Filed: Aug. 23, 2019

(51) Int. Cl.
*G06F 15/16* (2006.01)
*H04L 12/26* (2006.01)

(52) U.S. Cl.
CPC ........... *H04L 43/50* (2013.01); *H04L 43/045* (2013.01); *H04L 43/062* (2013.01); *H04L 43/0817* (2013.01); *H04L 43/12* (2013.01)

(58) Field of Classification Search
CPC ..... H04L 43/50; H04L 43/045; H04L 43/062; H04L 43/0817; H04L 43/12
USPC ........................................................ 709/224
See application file for complete search history.

(56) References Cited

U.S. PATENT DOCUMENTS

| | | |
|---|---|---|
| 5,263,029 A | 11/1993 | Wicklund, Jr. |
| 5,276,789 A | 1/1994 | Besaw et al. |
| 5,757,820 A | 5/1998 | Angelotti |
| 6,122,753 A | 9/2000 | Masuo et al. |
| 6,321,356 B1 | 11/2001 | Snodgrass et al. |
| 6,513,138 B1 | 1/2003 | Ohsawa |
| 6,625,764 B1 * | 9/2003 | Dawson .................. H04L 41/24 714/703 |
| 6,775,804 B1 * | 8/2004 | Dawson ................ H03M 13/09 714/776 |
| 6,782,503 B1 * | 8/2004 | Dawson .................. H04L 43/50 714/739 |
| 7,154,860 B1 | 12/2006 | Nanba |
| 7,221,912 B2 | 5/2007 | Nelson et al. |
| 7,272,765 B2 | 9/2007 | Ichiyoshi |

(Continued)

FOREIGN PATENT DOCUMENTS

WO   WO 2016/022297 A1   2/2016

OTHER PUBLICATIONS

Notice of Allowance and Fee(s) Due & Applicant-Initiated Interview Summary for U.S. Appl. No. 14/452,205 (dated Dec. 15, 2016).

(Continued)

*Primary Examiner* — Moustafa M Meky

(57) ABSTRACT

According to one method for debugging test traffic generation, the method occurs at a test system implemented using at least one processor and at least one memory. The method includes generating test traffic, wherein generating the test traffic includes receiving routing information from a system under test (SUT) via at least one routing protocol, determining traffic header data using the routing information, and storing resolution processing path information indicating how the traffic header data was determined; and displaying, using a display, test traffic data, wherein displaying the test traffic data includes displaying at least some of the resolution processing path information for at least some of the traffic header data.

20 Claims, 10 Drawing Sheets

(56) References Cited

U.S. PATENT DOCUMENTS

| | | | |
|---|---|---|---|
| 7,370,236 B2 | 5/2008 | Szucs et al. | |
| 7,500,158 B1 | 3/2009 | Smith et al. | |
| 7,590,903 B2 | 9/2009 | Volkerink et al. | |
| 8,031,623 B2 | 10/2011 | Beeson et al. | |
| 8,086,660 B2 | 12/2011 | Smith | |
| 8,117,218 B2* | 2/2012 | Dam | G06Q 50/04 707/756 |
| 8,255,749 B2 | 8/2012 | Swoboda | |
| 8,654,790 B2* | 2/2014 | Haver | H04L 43/062 370/474 |
| 8,826,088 B2 | 9/2014 | Swoboda | |
| 9,003,292 B2 | 4/2015 | Smith et al. | |
| 9,246,772 B2 | 1/2016 | Smith et al. | |
| 9,350,622 B2 | 5/2016 | Smith et al. | |
| 9,356,855 B2 | 5/2016 | Gintis | |
| 9,628,356 B2 | 4/2017 | Gintis | |
| 9,736,053 B2 | 8/2017 | Zhang et al. | |
| 9,929,915 B2 | 3/2018 | Erickson et al. | |
| 9,948,927 B2* | 4/2018 | Kuehnis | G06K 9/036 |
| 2002/0093961 A1 | 7/2002 | Sharma et al. | |
| 2003/0043745 A1 | 3/2003 | Kano et al. | |
| 2003/0097438 A1 | 5/2003 | Bearden et al. | |
| 2003/0140279 A1 | 7/2003 | Szucs et al. | |
| 2005/0094567 A1* | 5/2005 | Kannan | H04L 41/5009 370/241 |
| 2006/0159033 A1 | 7/2006 | Suzuki et al. | |
| 2006/0268944 A1 | 11/2006 | Xu | |
| 2007/0081549 A1 | 4/2007 | Cicchetti et al. | |
| 2007/0081553 A1 | 4/2007 | Cicchetti et al. | |
| 2007/0291650 A1 | 12/2007 | Ormazabal | |
| 2008/0048726 A1* | 2/2008 | Hafed | G01R 31/2882 327/9 |
| 2008/0162994 A1 | 7/2008 | Szucs et al. | |
| 2008/0198768 A1 | 8/2008 | Nanjundaswamy et al. | |
| 2008/0201733 A1 | 8/2008 | Ertugrul et al. | |
| 2009/0077163 A1 | 3/2009 | Ertugrul et al. | |
| 2009/0222694 A1 | 9/2009 | Adir et al. | |
| 2009/0303880 A1 | 12/2009 | Maltz et al. | |
| 2009/0327903 A1 | 12/2009 | Smith et al. | |
| 2010/0058457 A1 | 3/2010 | Ormazabal | |
| 2010/0074141 A1 | 3/2010 | Nguyen | |
| 2010/0110883 A1 | 5/2010 | Russell et al. | |
| 2010/0131522 A1* | 5/2010 | Dam | G06Q 50/04 707/756 |
| 2010/0204948 A1 | 8/2010 | Kirrmann et al. | |
| 2011/0211473 A1 | 9/2011 | Matityahu et al. | |
| 2011/0305168 A1 | 12/2011 | Koide | |
| 2012/0051234 A1 | 3/2012 | Gintis et al. | |
| 2012/0151596 A1 | 6/2012 | McClure et al. | |
| 2012/0163227 A1* | 6/2012 | Kannan | H04L 41/5038 370/252 |
| 2013/0159865 A1 | 6/2013 | Smith et al. | |
| 2013/0173940 A1 | 7/2013 | Sargent et al. | |
| 2013/0305091 A1 | 11/2013 | Stan et al. | |
| 2013/0311646 A1 | 11/2013 | Nikaido et al. | |
| 2013/0329572 A1 | 12/2013 | Gintis | |
| 2014/0043981 A1* | 2/2014 | Regev | H04L 43/04 370/241 |
| 2014/0098824 A1 | 4/2014 | Edmiston | |
| 2014/0115421 A1 | 4/2014 | Cai | |
| 2014/0269386 A1 | 9/2014 | Chu et al. | |
| 2014/0269390 A1 | 9/2014 | Ciodaru et al. | |
| 2014/0321285 A1 | 10/2014 | Chew et al. | |
| 2014/0341052 A1 | 11/2014 | Devarasetty et al. | |
| 2015/0003259 A1 | 1/2015 | Gao | |
| 2015/0106669 A1 | 4/2015 | Gintis | |
| 2015/0106670 A1 | 4/2015 | Gintis | |
| 2018/0115469 A1 | 4/2018 | Erickson et al. | |

OTHER PUBLICATIONS

Final Office Action for U.S. Appl. No. 14/452,205 (dated Aug. 11, 2016).

Non-Final Office Action for U.S. Appl. No. 14/452,205 (dated Mar. 24, 2016).

Notice of Allowance and Fee(s) Due for U.S. Appl. No. 14/051,424 (dated Feb. 1, 2016).

Advisory Action Before the Filing of an Appeal Brief for U.S. Appl. 14/051,424 (dated Dec. 1, 2015).

Notification of Transmittal of the International Search Report and the Written Opinion of the International Searching Authority, or the Declaration for International Application No. PCT/US2015/041633 (dated Nov. 4, 2015).

Final Office Action for U.S. Appl. No. 14/051,424 (dated Aug. 20, 2015).

Non-Final Office Action for U.S. Appl. No. 14/051,424 (dated Mar. 25, 2015).

Commonly-assigned, co-pending U.S. Appl. No. 14/452,205 for "Methods, Systems, and Computer Readable Media for Providing User Interfaces for Specification of System Under Test (SUT) and Network Tap Topology and for Presenting Topology Specific Test Results," (Unpublished, filed Aug. 5, 2014).

Commonly-assigned, co-pending U.S. Appl. No. 14/051,424 for "Methods, Systems, and Computer Readable Media for Providing for Specification or Autodiscovery of Device Under Test (DUT) Topology Information," (Unpublished, filed Oct. 10, 2013).

Han et al., "Star Topology Test Architecture for Multi-site Testing," IEEE, pp. 1-5 (Jun. 27, 2012).

Poretsky et al., "Benchmarking Methodology for Link-State IGP Data Plane Route Convergence," draft-ietf-bmwg-igp-dataplane-conv-meth-21, Network Working Group, pp. 1-28 (May 10, 2010).

Haris, Abdullah, "A DTN Study: Analysis of Implementations and Tools," Technical University of Denmark, pp. 1-86 (2010).

Agilent Technologies, Agilent Triple Play NGN Seminar 2006—Ensuring your Network is Triple-Play Ready, pp. 1-159 (Mar. 22, 2006).

Jörg, David, "Ants-Based Routing in Mobile Ad-Hoc Networks," Diplomarbeit der Philosophisch-naturwissenschaftlichen Fakultät der Universität Bern, pp. 1-89 (2004).

* cited by examiner

300

| MSG ID | MPLS LABEL | SRC IP | SRC PORT | SRC MAC | DEST IP | DEST PORT | DEST MAC | PROTO |
|---|---|---|---|---|---|---|---|---|
| 1 | | 20.1.2.34 | 4562 | W | 1.1.1.1 | 4562 | A | 17 |
| 2 | | 10.1.2.34 | 3456 | X | 30.1.1.1 | 3456 | B | 17 |
| 3 | 400 | 10.1.1.23 | 506 | Y | 10.1.1.1 | 506 | C | 6 |
| 4 | 200 | 20.1.1.68 | 233 | Z | 20.1.1.1 | 233 | D | 6 |
| 5 | 1234 | 20.1.1.58 | 343 | Z | 20.1.1.1 | 343 | D | 6 |

IP→OSPF→VLAN→ETHERNET

| MSG ID | MPLS LABEL | SRC IP | SRC PORT | SRC MAC | DEST IP | DEST PORT | DEST MAC | PROTO |
|---|---|---|---|---|---|---|---|---|
| 1 | | 20.1.2.34 | 4562 | W | 1.1.1.1 | 4562 | A | 17 |
| 2 | | 10.1.2.34 | 3456 | X | 30.1.1.1 | 3456 | B | 17 |
| 3 | 400 | 10.1.1.23 | 506 | Y | 10.1.1.1 | 506 | C | 6 |
| 4 | 200 | 20.1.1.68 | 233 | Z | 20.1.1.1 | 233 | D | 6 |
| 5 | 1234 | ...58 | 343 | Z | 20.1.1.1 | 343 | D | 6 |

IP→OSPF→ISIS→VLAN→ETHERNET

| MSG ID | MPLS LABEL | SRC IP | SRC PORT | SRC MAC | DEST IP | DEST PORT | DEST MAC | PROTO |
|---|---|---|---|---|---|---|---|---|
| 1 | | 20.1.2.34 | 4562 | W | 1.1.1.1 | 4562 | A | 17 |
| 2 | | 10.1.2.34 | 3456 | X | 30.1.1.1 | 3456 | B | 17 |
| 3 | 400 | 10.1.1.23 | 506 | Y | 10.1.1.1 | 506 | C | 6 |
| 4 | 200 | 20.1.1.68 | 233 | Z | 20.1.1.1 | 233 | D | 6 |
| 5 | 1234 | 20.1.1.58 | 343 | Z | 20.1.1.1 | 343 | D | 6 |

TOPOLOGY #4→ETHERNETV2→BGPV4 →
RULE('DEF'):[ INPUT (20.1.1.1, TYPE 'X') = OUTPUT(ROUTE 45, MPLS LABEL 1234)]

| MSG ID | MPLS LABEL | SRC IP | SRC PORT | SRC MAC | DEST IP | DEST PORT | DEST MAC | PROTO |
|---|---|---|---|---|---|---|---|---|
| 1 | | 20.1.2.34 | 4562 | W | 1.1.1.1 | 4562 | A | 17 |
| 2 | | 10.1... | 3456 | X | 30.1.1.1 | 3456 | B | 17 |
| 3 | 400 | 1... | 506 | Y | 10.1.1.1 | 506 | C | 6 |
| 4 | 200 | | 233 | Z | 20.1.1.1 | 233 | D | 6 |
| 5 | 1234 | | 43 | Z | 20.1.1.1 | 343 | D | 6 |

TOPOLOGY #2 → IPV4 TABLE #3 → 'ADDRESS' COLUMN → ROW 54

| MSG ID | MPLS LABEL | SRC IP | SRC PORT | SRC MAC | DEST IP | DEST PORT | DEST MAC | PROTO |
|---|---|---|---|---|---|---|---|---|
| 1 | | 20.1.2.34 | 4562 | W | 1.1.1.1 | 4562 | A | 17 |
| 2 | | 10.1.2.34 | 3456 | X | 30.1.1.1 | 3456 | B | 17 |
| 3 | 400 | 10.1.1.23 | 506 | Y | 10.1.1.1 | 506 | C | 6 |
| 4 | 200 | 20.1.1.68 | 233 | Z | 20.1.1.1 | 233 | | 6 |
| 5 | 1234 | 20.1.1.58 | 343 | Z | 20.1.1.1 | 343 | | 6 |

RULE ('SAME SUBNET') → ARP → REPLY OF 'C'

| MSG ID | MPLS LABEL | SRC IP | SRC PORT | SRC MAC | DEST IP | DEST PORT | DEST MAC | PROTO |
|---|---|---|---|---|---|---|---|---|
| 1 | | 20.1.2.34 | 4562 | W | 1.1.1.1 | 4562 | A | 17 |
| 2 | | 10.1.2.34 | 3456 | X | 255.255.255.255 | 3456 | B | 17 |
| 3 | 400 | 10.1.1.23 | 506 | Y | 10.1.1.1 | 506 | C | 6 |
| 4 | 200 | 20.1.1.68 | 233 | Z | 20.1.1.1 | | D | 6 |
| 5 | 1234 | 20.1.1.58 | 343 | Z | 20.1.1.1 | | D | 6 |

RULE ('ABC')→USING IPV4 BROADCAST, USE BROADCAST MAC

FIG. 8

METHODS, SYSTEMS, AND COMPUTER READABLE MEDIA FOR DEBUGGING TEST TRAFFIC GENERATION

TECHNICAL FIELD

The subject matter described herein relates to communications network testing. More specifically, the subject matter relates to methods, systems, and computer readable media for debugging test traffic generation.

BACKGROUND

Network test systems generally test network or nodes therein for configuration and/or performance issues by sending and analyzing network traffic. For example, a test system may generate and send a number of test messages (e.g., packets) to a system under test (SUT) (e.g., one or more network-connected devices). In this example, the SUT may process the test message and send the test messages or related response messages back at the test system for analysis.

While network test systems can be useful for identifying various issues, there can be various inefficiencies associated with operating a network test system and/or understanding test results, e.g., test metrics and statistics, generated by the network test system. For example, while a network test system may provide a user interface for generating test traffic via templates and user-selectable options, various traffic data, such as message header information (e.g., internet protocol (IP) addresses, media access control (MAC) addresses, etc.) or route related information, may be determined as part of the testing using one or more network protocols. In this example, if some test traffic or related responses from a SUT fail to come back to the test system, there may not be an easy way for a test operator to determine why that traffic failed or how traffic data in those failed messages was determined.

Accordingly, a need exists for methods, systems, and computer readable media for debugging test traffic generation.

SUMMARY

Methods, systems, and computer readable media for debugging test traffic generation are disclosed. According to one method for debugging test traffic generation, the method occurs at a test system implemented using at least one processor and at least one memory. The method includes generating test traffic, wherein generating the test traffic includes receiving routing information from a system under test (SUT) via at least one routing protocol, determining traffic header data using the routing information, and storing resolution processing path information indicating how the traffic header data was determined; and displaying, using a display, test traffic data, wherein displaying the test traffic data includes displaying at least some of the resolution processing path information for at least some of the traffic header data.

A system for debugging test traffic generation includes a test system implemented using at least one processor and at least one memory. The test system is configured for: generating test traffic, wherein generating the test traffic includes receiving routing information from a SUT via at least one routing protocol, determining traffic header data using the routing information, and storing resolution processing path information indicating how the traffic header data was determined; and displaying, using a display, test traffic data, wherein displaying the test traffic data includes displaying at least some of the resolution processing path information for at least some of the traffic header data.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 3 is a diagram illustrating an example graphical user interface (GUI) for displaying example resolution processing path information for a multi-protocol label switching (MPLS) label;

FIG. 4 is a diagram illustrating an example GUI for displaying example resolution processing path information for another MPLS label;

FIG. 5 is a diagram illustrating an example GUI for displaying example resolution processing path information for another MPLS label;

FIG. 6 is a diagram illustrating an example GUI for displaying example resolution processing path information for a source internet protocol (IP) address;

FIG. 7 is a diagram illustrating an example GUI for displaying example resolution processing path information for a destination media access control (MAC) address;

FIG. 8 is a diagram illustrating an example GUI for displaying example resolution processing path information for another destination MAC address;

DETAILED DESCRIPTION

Figure 1:
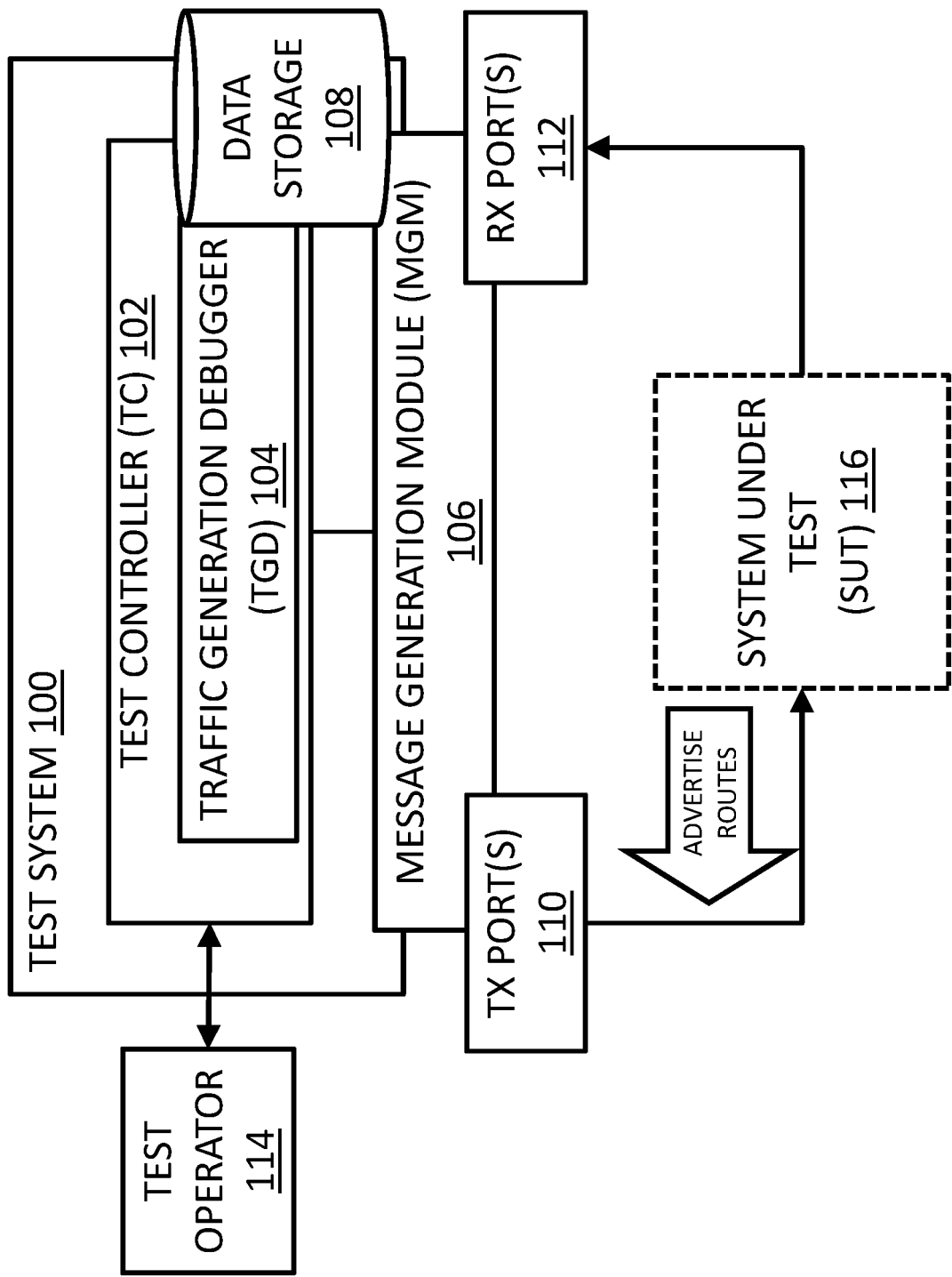
FIG. 1 is a diagram illustrating an example test system for debugging test traffic generation.

The subject matter described herein relates to methods, systems, and computer readable media for debugging test traffic generation. When testing one or more computing or networking resources, it may be desirable to test the resources under non-trivial load conditions that mirror or closely approximate real world scenarios. Test systems may generate test messages that are sent to a system under test (SUT) and may receive and analyze responses by the SUT. As used herein, a test message may refer to various data units, such as a packet, a frame, a datagram. Example test messages may an internet protocol (IP) message, a user datagram protocol (UDP) message, a transport control protocol (TCP) message, or, more generally, a protocol data unit (PDU). To test various aspects of a network or device(s) therein, a test operator may need to configure the test messages to include certain test message data (e.g., message header parameter values).

In some scenarios, testing may involve one or more mechanisms that are used in determining or setting test message data. For example, a test system may test a network device including its functionality for advertising routing information using one or more routing protocols. In this example, the configuration of the test system may in part be dependent on the network device's ability to advertise routing information.

While a conventional test system may provide user interfaces for configuring test traffic or related test settings, difficulties can occur when attempting to identify test traffic configuration issues, especially when some test traffic data is not directly selected by the user. For example, if the test system is configured to utilize routing information from a SUT when setting message header information (e.g., multi-protocol label switching (MPLS) labels, media access control (MAC) addresses, etc.) in test messages, a test operator may be unable to easily or quickly determine how one or more message header parameter values were determined and/or to easily or quickly determine why one or more test messages were not processed or routed correctly by the SUT.

In accordance with some aspects of the subject matter described herein, techniques, methods, and systems for debugging test traffic generation are disclosed. For example, a (e.g., a testing platform, a device, or a node) or a module (e.g., a field-programmable gateway array (FPGA), an application-specific integrated circuit (ASIC), or software executing on a processor) in accordance with various aspects described herein may provide resolution processing path information or related data via one or more graphical user interfaces (GUIs). In this example, a GUI may allow a user to view test traffic or related data represented as a data table or other data structure, where each row may represent a different test message and each cell may represent particular message data or related information, e.g., a message header parameter value (such as a source IP address, a source port information, a source MAC address, a destination IP address, a destination port information, a destination MAC address, a protocol identifier, or an MPLS label). Continuing with this example, the GUI may allow a user to select (e.g., click) a particular cell to display resolution processing path information indicating how the message header parameter value was determined.

In some embodiments, resolution processing path information may include any data or analytics indicating one or more data elements used in determining, setting, or resolving a value. For example, in the context of test traffic generation, a test system may utilize multiple data elements (e.g., data sources, protocol-specific and/or stack-specific processing logic accessible to the test system or a related entity, user-defined settings, predefined or dynamic data tables or data stores (e.g., a topology table and/or a routing table), data obtained from a network node using a particular protocol or adjunct message, etc.) to identify or resolve a message parameter value, e.g., an IP address or a MAC address, used in a test message.

In some embodiments, a resolution processing path may refer to data elements (e.g., data sources and/or processing operations) representing processing steps utilized in determining, setting, or resolving a test message value and may or may not refer to a particular order the data elements were utilized. For example, a resolution processing path may indicate data elements based on chronological order or based on resolution impact. In another example, a resolution processing path may indicate data elements in an unordered manner.

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a diagram illustrating an example test system 100 for debugging test traffic generation. Test system 100 may represent any suitable entity or entities (e.g., one or more computing platforms, nodes, or devices) associated with testing one or more aspects of SUT 116. For example, test system 100 may generate and send test traffic (e.g., one or more data units) to SUT 116. In this example, after the test traffic is processed by SUT 116, test system 100 may receive the test traffic or related response traffic from SUT 116 and analyze one or more performance aspects associated with SUT 116.

In some embodiments, test system 100 may be a stand-alone tool, a testing device, a test system, or software executing on at least one processor.

In some embodiments, test system 100 may be a single node or may be distributed across multiple computing platforms or nodes. In some embodiments, test system 100 may include one or more modules for performing various functions. For example, test system 100 may include a test system emulation module for emulating a node or device that communicates with SUT 116.

Test system 100 may include a test controller (TC) 102, a traffic generation debugger (TGD) 104, a traffic generation module (TGM) 106, data storage 108, one or more transmit (TX) port(s) 110, and one or more receive (RX) port(s) 112. TC 102 may be any suitable entity or entities (e.g., software executing on a processor, an FPGA, an ASIC, or a combination of software, an FPGA, and/or an ASIC) for performing one or more aspects associated with testing SUT 106 and/or various aspects thereof. In some embodiments, TC 102 may be implemented using one or more processors and/or memory. For example, TC 102 may utilize one or more processors (e.g., executing software stored in memory) to generate test plans or related test sessions. In this example, TC 102 may also utilize one or more processors to send instructions to various modules or entities (e.g., TGM 106) in test system 100 for controlling (e.g., pause, restart, or stop) a test session, e.g., based on input from test operator 114.

In some embodiments, test system 100, TC 102, TGM 106, and/or another entity may provide one or more communications interfaces and/or ports for communicating with test operator 114. Test operator 114 may be any entity (e.g., an automated system or a device or system controlled or controllable by a human user) for selecting and/or configuring various aspects associated with testing SUT 116 and/or debugging traffic generation or related test traffic issues. For example, various user interfaces (e.g., an application user interface (API) and/or a GUI) may be provided for inputting or setting test system configuration information, such as a time out period for assuming message loss, types of metrics to be generated, frequency of metric generation, and various test cases or related settings. In this example, one test configuration GUI may allow test operator 114 to provision test case configuration settings, message parameter values, user defined field (UDF) values, rules, emulated network devices, protocols used by SUT 116 and emulated network devices, among other things. In some embodiments, one or more user interfaces for testing SUT 116 and/or for providing configuration information may support automation (e.g., via one or more scripting languages), a representation state transfer (REST) API, a command line, and/or a web based GUI.

In some embodiments, test operator 114 may provide test configuration information for configuring a test (e.g., one or more test cases or test sessions) via a test configuration GUI, data settings file(s), or another mechanism. Example test configuration information may include physical and datalink layer protocol information (e.g., Ethernet), network layer information (e.g., IP), transport layer information (e.g., UDP, TCP, etc.), and/or adjunct protocol information, such as routing protocols associated with a particular Open Systems interconnect (OSI) stack layer (e.g., Open Shortest Path First (OSPF) and/or Intermediate System to Intermediate System (ISIS) routing protocols that are used in conjunction with IP-configured network paths, MPLS, etc.).

In some testing scenarios, test system 100, TGM 106, and/or another entity may be configured to emulate network devices that utilize a particular protocol layer configuration (e.g., Ethernet/IP/TCP/etc.) and a corresponding set of adjunct protocols (e.g., MPLS/OSPF). In such testing scenarios, using these adjunct protocols in a test case may require, for example, that SUT 116 or devices therein actively use a routing protocol (e.g., OSPF or ISIS (or both)) to send route advertisements during the execution of a test (e.g., during an initial test traffic generation phase) so that the emulated network devices learn about the routing capabilities of neighboring network elements.

TGD 104 may be any suitable entity or entities (e.g., software executing on one or more processors) for performing one or more aspects associated with providing resolution processing path information. In some embodiments, TGD 104 may generate or provide a GUI for previewing and/or analyzing test traffic (e.g., prior to being sent to SUT 116) and/or for viewing and/or analyzing test results (e.g., after or during testing of SUT 116). For example, TGD 104 may provide a GUI or other user interface that depicts tabular test traffic and/or test results associated with one or more tests. In some embodiments, test results data may include test traffic sent and/or received during a test and may include test message header parameter values and/or other related data (e.g., error messages or message outcomes). In some embodiments, when displaying test traffic and/or test results, TGD 104 may allow a user (e.g., test operator 114) to select a parameter value (e.g., a MPLS label) for a test message and TGD 104 may dynamically render an associated resolution processing path indicating how that parameter value was determined or set.

In some embodiments, TGD 104 may include functionality for analyzing test traffic and determining involved resolution processing paths for a test (e.g., one or more test cases). For example, for a given test, TGD 104 may identify a number of resolution processing paths used in generating values in test messages and may count or tally the number of values per resolution processing path.

In some embodiments, TGD 104 may include functionality for providing distribution information (e.g., histogram data associated with resolution processing paths for various test message values) to test operator 114. For example, TGD 104 or another entity may generate histogram data for each possible resolution processing path associated with various test message value (e.g., an destination MAC address or an MPLS label). As such, the relative frequency of occurrence of each possible resolution processing path can be calculated and displayed to the user. In this example, for a particular test, TGD 104 may display a data table, a Sankey diagram, or other visual aid indicating that 90% of test messages used a resolution processing path of 'IP→ISIS→Ethernet' to generated a destination MAC address and 10% of test messages used a resolution processing path of 'IP→I-SIS→OSPF→Ethernet' to generated a destination MAC address.

In another example, TGD 104 or another entity may provide a summary of each resolution processing path for a destination MAC address used in test messages. In this example, the path summary data may indicate 8000 out of 9000 values were generated using Path 1 (IP→same subnet→address resolution protocol (ARP)→successful); 500 out of 9000 values were generated using Path 2 (IP→different subnet→gateway→ARP→successful); and 500 out of 9000 values were generated using Path 3 (IP→diff subnet-→gateway override). In this example, TGD 104 may provide a GUI for allowing test operator 114 to determine which test messages in a test where associated with a given resolution processing path.

In some embodiments, TGD 104 may provide a GUI for selecting from a menu of possible paths associated with a test message value and filter the contents of a message preview table based on one (or more) resolution processing paths or data element(s) therein. In some embodiments, TGD 104 may provide a GUI or GUI element for selecting a particular message parameter value (e.g., a destination IP address) and displaying configuration settings and/or data sources responsible for generating the selected message parameter value.

In some embodiments, TGD 104 may identify a number of resolution processing paths used in generating parameters in test messages of a test and correlate message outcomes per resolution processing paths and per test message parameter value, e.g., to identify their relative frequency of occurrence and potentially indicate possible configuration issues. For example, TGD 104 may analyze disposition of test messages associated with a test message parameter value and correlate the test messages' disposition (e.g., failed, error, success, etc.) with the resolution processing path(s) that generated the test message parameter value. In this example, TGD 104 may detect or identify an issue by such correlation, e.g., if all messages that generated a test message parameter value via a particular resolution processing path resulted in a failure state then an configuration issue may be present and test operator 114 may be notified.

In some embodiments, TGD 104 may include functionality for notifying test operator 114 and/or other entities regarding various potential issues. For example, for a given test, TGD 104 may identify a number of resolution processing paths used in generating values in test messages and may count or tally the number of values per resolution processing path. In this example, if any resolution processing path was used less than a threshold value (e.g., 5%), then TGD 104 may generate a notification to test operator 114 indicating that 'edge case' values were found so that the impact of these values or related resolution processing path(s) can be further investigated, if needed.

TGM 106 may be any suitable entity or entities (e.g., software executing on a processor, an ASIC, an FPGA, or a combination of software, an ASIC, or an FPGA) for performing one or more aspects associated with processing (e.g., receiving, generating, sorting, analyzing, and/or sending) test messages (e.g., messages, frames, and/or other data units). For example, TGM 106 may be configured to generate test messages for a number of emulated flows or test sessions. In this example, each test message may include various data (e.g., header information and payload information) which is determined using configuration information provided by test operator 114, TC 102, and/or other entities.

In some embodiments, TGM 106 may include for functionality for emulating one or more network nodes or devices during testing of SUT 116. For example, TGM 106 may emulate a web server, a smartphone, a computer, or other device that communicates with SUT 116 or a related entity. In this example, TGM 106 may emulate the one or more device depending on the test being performed and/or the entity being tested.

In some embodiments, TGM 106 may use one or more multiple ports (e.g., communications interfaces) for receiving and sending various types of data units, such as Ethernet frames, PDUs, datagrams, UDP messages, TCP messages, IP version 4 (v4) packets, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, TGM 106 may provide one or more communications interfaces and/or ports 110-112 for interacting with SUT 116. For example, TGM 106 or another entity may be configured to send test messages to SUT 116 via one or more of TX ports 110 and to receive test messages to SUT 116 via one or more of ports RX 112. Each port or communication interface utilize any suitable entity or entities (e.g., one or more network interface cards (NICs), physical processors, and/or other hardware)

In some embodiments, ports 110-112 may utilize or access data storage 108 and/or local memory. In some embodiments, after receiving test messages or related messages from SUT 116, one or more of ports 110-112 may be configured to various actions, such as timestamping, generating/updating statistics, storing statistics, and/or clearing old statistics.

SUT 116 may be any suitable entity or entities (e.g., devices, systems, or platforms) for communicating with test system 100 and/or receiving, processing, forwarding and/or sending one or more test messages. For example, SUT 116 may include various devices and/or communication equipment, e.g., a network router, a network switch, a network device, a server, or a network controller. In another example, SUT 116 may include one or more systems and/or computing platforms, e.g., a data center or a group of servers and/or a related communications network. In yet another example, SUT 116 may include one or more networks or related components, e.g., an access network, a core network, or the Internet.

In some embodiments, TGM 106 may include functionality for storing message related data prior to, during, and/or after testing SUT 116. For example, prior to sending a test message containing multiple header parameters determined using one or more protocols and/or data lookups, TGM 106 may be configured to store information (e.g., resolution processing path data for various message parameter values) related to the test messages in a data structure that indexes on one or more path or parameter identifiers, e.g., at data storage 108. In this example, TGM 106 may store this information and/or update existing information in the data structure, e.g., after the test messages are sent to SUT 116 and received back from SUT 116.

In some embodiments, TGM 106 may include functionality for waiting for responses (e.g., test messages and/or other messages) from SUT 116. For example, after sending a test message and storing information about the test message, TGM 106 or another entity may be configured to wait for the test message or related information to be received from SUT 116. In this example, TGM 106 or another entity may use a timer or another technique for determining how long to wait before assuming that the test message was lost or misrouted. If an error message is received and/or after a certain amount of time has elapsed, TGM 106 or another entity may perform one or more actions, such as generating a message related metric and/or updating a relevant data structure entry.

In some embodiments, TGD 104, TGM 106, or another entity may include functionality for analyzing responses received from SUT 116. For example, TGM 106 may be configured to receive a test message from SUT 116 and may determine whether the test message is expected, unexpected, corrupted, and/or out of order. In another example, TGM 106 may be configured to receive an error message from SUT 116 and may determine which, if any, test message or message flow is associated with the error message.

In some embodiments, TGD 104, TGM 106, or another entity may include functionality for reporting or providing resolution processing path information or related data, e.g., traffic generation debug information. For example, TGD 104 analyze test data received by TGM 106 or a related port. In this example, TGD 104 may provide the test data via one or more communications interfaces, e.g., a GUI or an API, test operator 114. In some examples, TGD 104 or another entity may convert, analyze, or utilize collected network traffic statistics and resolution processing path data to generate reports, graphs, or visualizations to test operator 114 or another entity.

In some embodiments, test system 100 or related entities may include functionality for accessing data storage 108. Data storage 108 may be any suitable entity or entities (e.g., a storage device, a non-transitory computer readable medium, or a storage system) for maintaining or storing information related to messages, message parameters, and/or related metrics. For example, data storage 108 may contain information usable for generating and providing resolution processing path information indicating how various test message parameters were determined for a test and/or how test messages were processed by SUT 116. In this example, data storage 108 may also contain reports or visual aids (e.g., tabular summary data representing sent and/or received test messages and/or Sankey diagrams showing various resolution processing paths of generated traffic and their outcomes during a test).

In some embodiments, data storage 108 may also contain metrics associated with one or more performance aspects of SUT 116 during one or more tests. For example, using configuration information regarding testing, data storage 108 may maintain a particular set of computed metrics for a first test and may maintain another set of computed metrics for a second test. In some embodiments, data storage 108 may be located at test system 100, another node, or distributed across multiple platforms or devices.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity. In another example, some nodes and/or functions may be separated into multiple entities.

Figure 2:
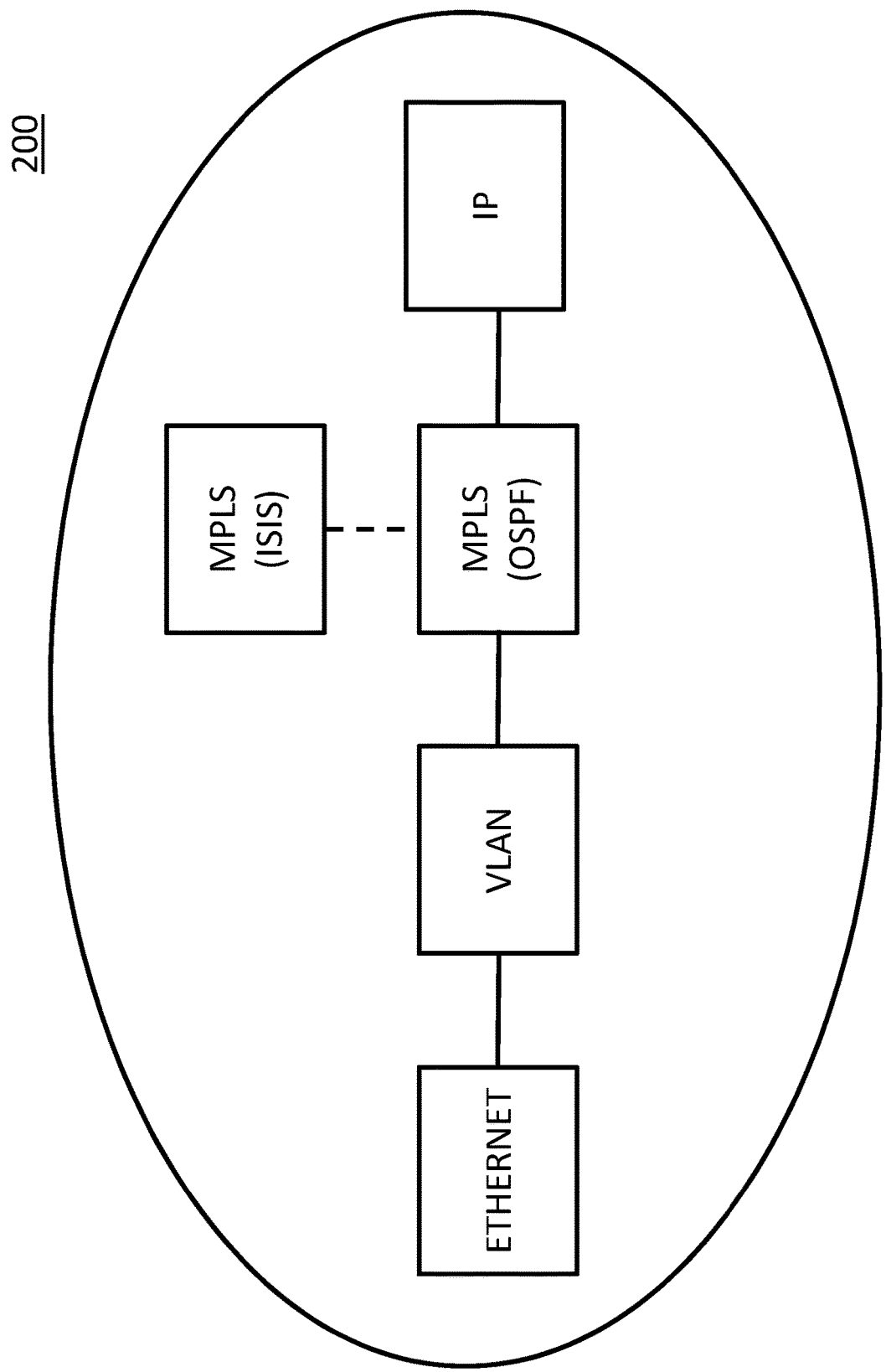
FIG. 2 is a diagram illustrating an example test traffic model.

FIG. 2 is a diagram illustrating an example test traffic model 200. In some embodiments, test system 100, TC 102, or another entity may provide a test configuration GUI for allowing test operator 114 to configure test messages or contents therein. For example, a test configuration GUI may be used to select which protocols are used by SUT 116 and test system 100 or related emulated network devices during a particular test. In this example, the test configuration GUI may also identify test message components or portions, e.g., multiple data units associated with different protocols can share an Ethernet frame.

Referring to FIG. 2, test traffic model 200 may indicate a particular message model or template for generating test messages used in a test. For example, test traffic model 200 may indicate that an Ethernet frame include a VLAN portion, a MPLS portion, and IP packet portion. In this example, the MPLS portion may be derived or determined using one or more routing protocols, e.g., OSPF and/or ISIS.

In some embodiments, a test configuration GUI may allow test operator 114 to select an order or priority to one or more protocols or stacks used in generating a test message. For example, test operator 114 may configure test system 100, TC 102, or another entity to utilize routing information from OSPF messages and if OSPF messages are not available then utilize routing information from ISIS messages or vice versa.

It will be appreciated that FIG. 2 is for illustrative purposes and that additional and/or different data may be usable for providing or representing resolution processing path information or related data.

FIG. 3 is a diagram illustrating an example GUI 300 for displaying example resolution processing path information for an MPLS label. In some embodiments, test system 100, TC 102, TGD 104, or another entity may provide a GUI for allowing test operator 114 to preview and/or analyze test traffic (e.g., test messages or packets). For example, GUI 300 may provide test message content (e.g., header parameter values and/or payload data) for all test messages in a given test or user-filtered subset thereof and, when a message value is selected (e.g., right-clicked), GUI 300 may provide resolution processing path information indicating where the message value came from or how it was determined, e.g., via a tooltip or pop-up window.

Referring to FIG. 3, GUI 300 may provide a data table representing test messages of a test or a portion thereof. In some embodiments, various rows in the data table may represent different test messages and various columns in the data table may represent message parameter values or other data (e.g., error messages, message outcomes, etc.). Example column values for the data table include a message identifier (MSG ID), a MPLS label, a source IP address (SRC IP), a source port value (SRC PORT), a source MAC address (SRC MAC), a destination IP address (DEST IP), a destination port value (DEST PORT), a destination MAC address (DEST MAC), and a protocol value (PROTO).

GUI 300 may provide a tooltip message or other user interface (UI) element displaying resolution processing path information when a data table cell is selected. For example, if MPLS label '200' is selected, a resolution processing path may be displayed as 'IP→OSPF→VLAN→ETHERNET'. In this example, the resolution processing path may indicate that test system 100 or a related entity determined the MPLS value by utilizing IP packet processing logic and related data, then OSPF processing logic and related data (e.g., from SUT 116), then VLAN processing logic and related data, and then Ethernet processing logic and related data.

In some embodiments, resolution processing path information displayed in GUI 300 may be stored in data storage 108 (e.g., by test system 100 or another entity concurrently with generating the message value) and may be indexed and retrievable using one or more identifiers, e.g., a message identifier and/or a particular message value.

In some embodiments, when a message value is selected, resolution processing path information displayed in GUI 300 may be dynamically calculated by test system 100 or another entity that is configured to reproduce the processing path associated with the selected message value. In such embodiments, test system 100 or another entity may avoid or minimize any steps or actions that are not needed to determine the message value (e.g., not generating other test traffic and not sending the test traffic to SUT 116).

It will be appreciated that FIG. 3 is for illustrative purposes and that additional and/or different data or visual aids may be usable for providing or representing resolution processing path information or related data.

FIG. 4 is a diagram illustrating an example GUI 400 for displaying example resolution processing path information for another MPLS label. In some embodiments, test system 100, TC 102, TGD 104, or another entity may provide a GUI for allowing test operator 114 to preview and/or analyze test traffic (e.g., test messages or packets). For example, GUI 400 may provide test message content (e.g., header parameter values and/or payload data) for all test messages in a given test or user-filtered subset thereof and, when a message value is selected (e.g., right-clicked), GUI 400 may provide resolution processing path information indicating where the message value came from or how it was determined, e.g., via a tooltip or pop-up window.

Referring to FIG. 4, GUI 400 may provide a data table representing test messages of a test or a portion thereof. In some embodiments, various rows in the data table may represent different test messages and various columns in the data table may represent message parameter values or other data (e.g., error messages, message outcomes, etc.).

GUI 400 may provide a tooltip message or other UI element displaying resolution processing path information when a data table cell is selected. For example, if MPLS label '400' is selected, a resolution processing path may be displayed as 'IP→OSPF→ISIS→VLAN→ETHERNET'. In this example, the resolution processing path may indicate that test system 100 or a related entity determined the MPLS value by utilizing IP packet processing logic and related data, then OSPF processing logic and related data, then ISIS processing logic and related data (e.g., test system 100 may be configured to use ISIS data if relevant OSPF data is not received from SUT 116), then VLAN processing logic and related data, and then Ethernet processing logic and related data.

In some embodiments, resolution processing path information displayed in GUI 400 may be stored in data storage 108 (e.g., by test system 100 or another entity concurrently with generating the message value) and may be indexed and retrievable using one or more identifiers, e.g., a message identifier and/or a particular message value.

In some embodiments, when a message value is selected, resolution processing path information displayed in GUI 400 may be dynamically calculated by test system 100 or another entity that is configured to reproduce the processing path associated with the selected message value. In such embodiments, test system 100 or another entity may avoid or minimize any steps or actions that are not needed to determine the message value (e.g., not generating other test traffic and not sending the test traffic to SUT 116).

It will be appreciated that FIG. 4 is for illustrative purposes and that additional and/or different data may be usable for providing or representing resolution processing path information or related data.

FIG. 5 is a diagram illustrating an example GUI 500 for displaying example resolution processing path information for another MPLS label. In some embodiments, test system 100, TC 102, TGD 104, or another entity may provide a GUI for allowing test operator 114 to preview and/or analyze test traffic (e.g., test messages or packets). For example, GUI 500 may provide test message content (e.g., header parameter values and/or payload data) for all test messages in a given test or user-filtered subset thereof and, when a message value is selected (e.g., right-clicked), GUI 500 may provide resolution processing path information indicating where the message value came from or how it was determined, e.g., via a tooltip or pop-up window.

Referring to FIG. 5, GUI 500 may provide a data table representing test messages of a test or a portion thereof. In some embodiments, various rows in the data table may represent different test messages and various columns in the data table may represent message parameter values or other data (e.g., error messages, message outcomes, etc.).

GUI 500 may provide a tooltip message or other UI element displaying resolution processing path information when a data table cell is selected. For example, if MPLS label '1234' is selected, a resolution processing path may be displayed as 'TOPOLOGY #4→ETHERNETV2→BGPV4→RULE('DEF'): [INPUT (20.1.1.1, TYPE 'X')=OUTPUT(ROUTE 45, MPLS LABEL 1234)]'. In this example, the resolution processing path may indicate that test system 100 or a related entity determined the MPLS value by utilizing a particular network topology processing logic and related data, then Ethernet version 2 processing logic and related data, then border gateway protocol (BGP) version 4 processing logic and related data, then a particular routing rule that takes as input a destination IP address and a message type associated with the test message and outputs a particular route and the selected MPLS label.

In some embodiments, resolution processing path information displayed in GUI 500 may be stored in data storage 108 (e.g., by test system 100 or another entity concurrently with generating the message value) and may be indexed and retrievable using one or more identifiers, e.g., a message identifier and/or a particular message value.

In some embodiments, when a message value is selected, resolution processing path information displayed in GUI 500 may be dynamically calculated by test system 100 or another entity that is configured to reproduce the processing path associated with the selected message value. In such embodiments, test system 100 or another entity may avoid or minimize any steps or actions that are not needed to determine the message value (e.g., not generating other test traffic and not sending the test traffic to SUT 116).

It will be appreciated that FIG. 5 is for illustrative purposes and that additional and/or different data may be usable for providing or representing resolution processing path information or related data.

FIG. 6 is a diagram illustrating an example GUI 600 for displaying example resolution processing path information for a source IP address. In some embodiments, test system 100, TC 102, TGD 104, or another entity may provide a GUI for allowing test operator 114 to preview and/or analyze test traffic (e.g., test messages or packets). For example, GUI 600 may provide test message content (e.g., header parameter values and/or payload data) for all test messages in a given test or user-filtered subset thereof and, when a message value is selected (e.g., right-clicked), GUI 600 may provide resolution processing path information indicating where the message value came from or how it was determined, e.g., via a tooltip or pop-up window.

Referring to FIG. 6, GUI 600 may provide a data table representing test messages of a test or a portion thereof. In some embodiments, various rows in the data table may represent different test messages and various columns in the data table may represent message parameter values or other data (e.g., error messages, message outcomes, etc.).

GUI 600 may provide a tooltip message or other UI element displaying resolution processing path information when a data table cell is selected. For example, if source IP address '20.1.2.34' is selected, a resolution processing path may be displayed as 'TOPOLOGY #2→IPV4 TABLE #3→ADDRESS COLUMN→ROW 54'. In this example, the resolution processing path may indicate that test system 100 or related entity determined the source IP address by utilizing a particular network topology processing logic and related data that indicated a particular IP v4 routing table, where a particular column in the routing table and a particular row in the routing table stored the selected source IP address.

In some embodiments, resolution processing path information displayed in GUI 600 may be stored in data storage 108 (e.g., by test system 100 or another entity concurrently with generating the message value) and may be indexed and retrievable using one or more identifiers, e.g., a message identifier and/or a particular message value.

In some embodiments, when a message value is selected, resolution processing path information displayed in GUI 600 may be dynamically calculated by test system 100 or another entity that is configured to reproduce the processing path associated with the selected message value. In such embodiments, test system 100 or another entity may avoid or minimize any steps or actions that are not needed to determine the message value (e.g., not generating other test traffic and not sending the test traffic to SUT 116).

It will be appreciated that FIG. 6 is for illustrative purposes and that additional and/or different data may be usable for providing or representing resolution processing path information or related data.

FIG. 7 is a diagram illustrating an example GUI 700 for displaying example resolution processing path information for a destination MAC address. In some embodiments, test system 100, TC 102, TGD 104, or another entity may provide a GUI for allowing test operator 114 to preview and/or analyze test traffic (e.g., test messages or packets). For example, GUI 700 may provide test message content (e.g., header parameter values and/or payload data) for all test messages in a given test or user-filtered subset thereof and, when a message value is selected (e.g., right-clicked), GUI 700 may provide resolution processing path information indicating where the message value came from or how it was determined, e.g., via a tooltip or pop-up window.

Referring to FIG. 7, GUI 700 may provide a data table representing test messages of a test or a portion thereof. In some embodiments, various rows in the data table may represent different test messages and various columns in the data table may represent message parameter values or other data (e.g., error messages, message outcomes, etc.).

GUI 700 may provide a tooltip message or other UI element displaying resolution processing path information when a data table cell is selected. For example, if destination MAC address '0' (e.g., '0' may represent a MAC address like '31:23:45:67:89:AB') is selected, a resolution processing path may be displayed as 'RULE ('SAME SUBNET')→ARP→REPLY OF '0' '. In this example, the resolution processing path may indicate that test system 100 or related entity determined the destination MAC address by utilizing a particular rule for test messages sent within a same IP subnet, where the rule involves sending an ARP request and receiving an ARP response indicating the selected MAC address.

In some embodiments, resolution processing path information displayed in GUI 700 may be stored in data storage 108 (e.g., by test system 100 or another entity concurrently with generating the message value) and may be indexed and retrievable using one or more identifiers, e.g., a message identifier and/or a particular message value.

In some embodiments, when a message value is selected, resolution processing path information displayed in GUI 700 may be dynamically calculated by test system 100 or another entity that is configured to reproduce the processing path associated with the selected message value. In such embodiments, test system 100 or another entity may avoid or minimize any steps or actions that are not needed to determine the message value (e.g., not generating other test traffic and not sending the test traffic to SUT 116).

It will be appreciated that FIG. 7 is for illustrative purposes and that additional and/or different data may be usable for providing or representing resolution processing path information or related data.

FIG. 8 is a diagram illustrating an example GUI 800 for displaying example resolution processing path information for another destination MAC address. In some embodiments, test system 100, TC 102, TGD 104, or another entity may provide a GUI for allowing test operator 114 to preview and/or analyze test traffic (e.g., test messages or packets). For example, GUI 800 may provide test message content (e.g., header parameter values and/or payload data) for all test messages in a given test or user-filtered subset thereof and, when a message value is selected (e.g., right-clicked), GUI 800 may provide resolution processing path information indicating where the message value came from or how it was determined, e.g., via a tooltip or pop-up window.

Referring to FIG. 8, GUI 800 may provide a data table representing test messages of a test or a portion thereof. In some embodiments, various rows in the data table may represent different test messages and various columns in the data table may represent message parameter values or other data (e.g., error messages, message outcomes, etc.).

GUI 800 may provide a tooltip message or other UI element displaying resolution processing path information when a data table cell is selected. For example, if destination MAC address 'B' (e.g., 'B' may represent a MAC address like 'FF:FF:FF:FF:FF:FF') is selected, a resolution processing path may be displayed as 'RULE ('ABC')→USING IPV4 BROADCAST, USE BROADCAST MAC'. In this example, the resolution processing path may indicate that test system 100 or related entity determined the destination MAC address by utilizing a particular rule for test messages sent between different IP subnets, where the rule involves sending the test message as an IP v4 broadcast message and using a standard broadcast MAC address, e.g., 'FF:FF:FF:FF:FF:FF'.

In some embodiments, resolution processing path information displayed in GUI 800 may be stored in data storage 108 (e.g., by test system 100 or another entity concurrently with generating the message value) and may be indexed and retrievable using one or more identifiers, e.g., a message identifier and/or a particular message value.

In some embodiments, when a message value is selected, resolution processing path information displayed in GUI 800 may be dynamically calculated by test system 100 or another entity that is configured to reproduce the processing path associated with the selected message value. In such embodiments, test system 100 or another entity may avoid or minimize any steps or actions that are not needed to determine the message value (e.g., not generating other test traffic and not sending the test traffic to SUT 116).

It will be appreciated that FIG. 8 is for illustrative purposes and that additional and/or different data may be usable for providing or representing resolution processing path information or related data.

Figure 9:
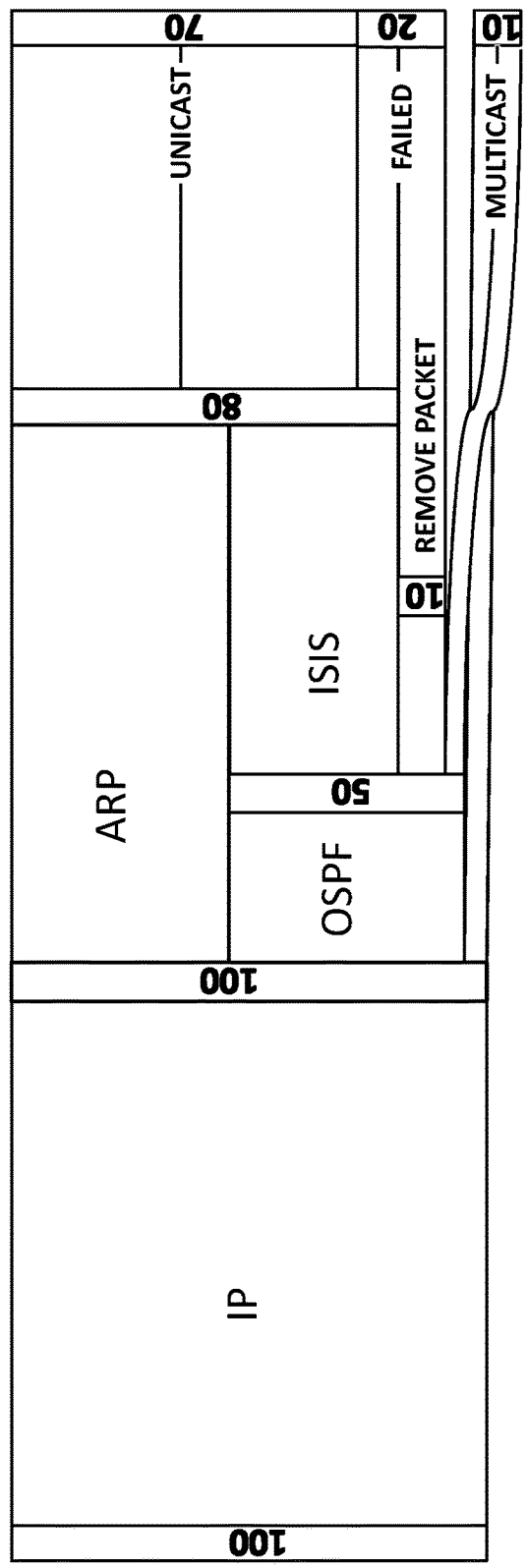
FIG. 9 is a Sankey diagram illustrating resolution processing path distribution associated with a test.

FIG. 9 is a Sankey diagram 900 illustrating resolution processing path distribution associated with a test. In some embodiments, TGD 104 may analyze disposition of test messages associated with a test message parameter value and correlate the test messages' disposition (e.g., failed, error, success, etc.) with the resolution processing path(s) that generated the test message parameter value. In such embodiments, TGD 104 may detect or identify an issue by such correlation, e.g., if all messages that generated a test message parameter value via a particular resolution processing path resulted in a failure state then an configuration issue may be present and test operator 114 may be notified.

Referring to FIG. 9, Sankey diagram 900 may indicate various data sources (e.g., protocol and/or stack related logic and related data) used to generate destination MAC addresses for test messages used in a test. As depicted, Sankey diagram 900 indicates that IP packet processing logic and related data was used to identify source and destination IP addresses for the test traffic. Sankey diagram 900 also indicates that about 45% of the total test traffic used ARP to identify a destination MAC address for a respective destination IP address (e.g., all test traffic having a source IP address within the same IP subnet as a destination IP address). Sankey diagram 900 also indicates that about 50% of the total test traffic used at least one routing protocol (e.g., OSPF and/or ISIS to identify a destination MAC address for a respective destination IP address and that about 5% of the total test traffic used a known MAC multicast address without using a routing protocol first.

Of the about 50% of the total test traffic that used at least the routing protocol OSPF to try to identify a destination MAC address, Sankey diagram 900 indicates that about 35% of the total test traffic also used ISIS to identify a destination MAC address for a respective destination IP address, that about 10% of the total test traffic was discarded or removed (or otherwise failed without using ISIS), and that about 5% of the total test traffic used a known MAC multicast address without using ISIS.

Of the about 80% of the total test traffic that did determine a destination MAC address using ARP or a routing protocol, Sankey diagram 900 indicates that about 70% of the total test traffic was unicast traffic that was successfully sent and/or received and that about 10% of the total test traffic was unicast traffic that failed to be sent and/or received.

It will be appreciated that FIG. 9 is for illustrative purposes and that additional and/or different data may be usable for providing or representing resolution processing path information or related data.

Figure 10:
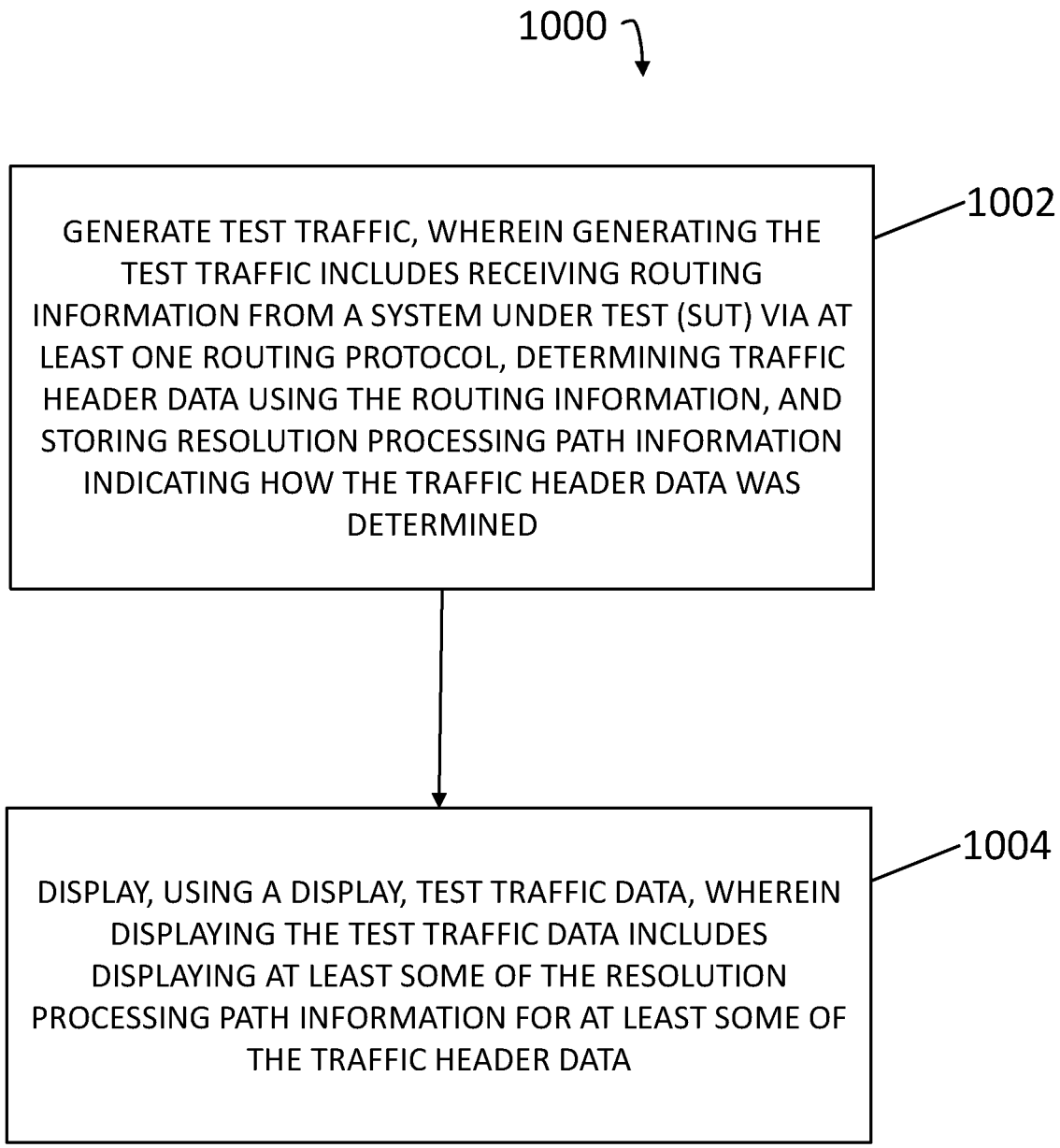
FIG. 10 is a diagram illustrating an example process for debugging test traffic generation.

FIG. 10 is a diagram illustrating an example process 1000 for debugging test traffic generation. In some embodiments, example process 1000, or portions thereof, may be performed by or at test system 100, TGD 104, and/or another node or module.

Referring to process 1000, in step 1002, test traffic may be generated, wherein generating the test traffic includes receiving routing information from the SUT via at least one routing protocol, determining traffic header data using the routing information, and storing resolution processing path information indicating how the traffic header data was determined. For example, test system 100 or entities therein may be instrumented to detect a processing path used for determining one or more test message values, e.g., MPLS labels, IP addresses, or MAC addresses.

In step 1004, test traffic data may be displayed using a display, wherein displaying the test traffic data includes displaying at least some of the resolution processing path information for at least some of the traffic header data. For example, TGD 104 or another entity may send data to a monitor, a screen, or other display device for displaying a test traffic previewer GUI that can provide resolution processing path information or related analytics for one or more test message values.

In some embodiments, displaying test results data may include providing at least one user interface element for filtering the test results data to display a portion of the test results data based a resolution processing path selected from among a plurality of resolution processing paths.

In some embodiments, displaying resolution processing path information for traffic header data may include providing at least one user interface element for selecting a first test message parameter value to display a first resolution processing path for the first test message parameter value. For example, test operator 114 may select a cell in a data table depicting test message contents. In this example, in response to the selection, a pop-up message or tooltip message may be displayed near the cell and may include resolution processing path information, e.g., as depicted in GUI 300.

In some embodiments, resolution processing path information may include one or more data elements indicating one or more communications protocols, protocol stacks, and/or data layers, wherein the data elements may indicate how a test message parameter value may be determined.

In some embodiments, traffic header data may include a source IP address, a source port information, a source MAC address, a destination IP address, a destination port information, a destination MAC address, a protocol identifier, and/or an MPLS label.

In some embodiments, test system 100 or another entity may be configured for sending the test traffic to the SUT; receiving the test traffic or related response traffic from the SUT; and displaying, using the display, test results data.

In some embodiments, test results data may include test message header parameter values and test message delivery outcomes.

In some embodiments, test results data may include histogram data indicating distribution of the test traffic along each of a plurality of resolution processing paths for the test traffic.

In some embodiments, histogram data may be represented using a Sankey diagram, a data table, or a visual aid.

The subject matter described herein for debugging test traffic generation improves the functionality of network test systems and/or related tools by reducing the amount of time needed to debug, analyze, and/or correct test traffic configuration issues and to analyze and/or understand test results, thereby making the configuration and use of test systems more efficient, cost-effective, and impactful. It should also be noted that a computing platform that implements subject matter described herein may comprise a special purpose computing device (e.g., test system 100) usable for testing performance aspects of SUT 116.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for debugging test traffic generation, the method comprising:
at a test system implemented using at least one processor and at least one memory:
generating test traffic, wherein generating the test traffic includes receiving routing information from a system under test (SUT) via at least one routing protocol, determining traffic header data using the routing information, and storing resolution processing path information indicating how the traffic header data was determined; and
displaying, using a display, test traffic data, wherein displaying the test traffic data includes displaying at least some of the resolution processing path information for at least some of the traffic header data.

2. The method of claim 1 comprising:
sending the test traffic to the SUT;
receiving the test traffic or related response traffic from the SUT; and
displaying, using the display, test results data.

3. The method of claim 2 wherein the test results data includes test message header parameter values and test message delivery outcomes.

4. The method of claim 2 wherein the test results data includes histogram data indicating distribution of the test traffic along each of a plurality of resolution processing paths for the test traffic.

5. The method of claim 4 wherein the histogram data is represented using a Sankey diagram, a data table, or a visual aid.

6. The method of claim 2 wherein displaying, using the display, the test results data includes providing at least one user interface element for filtering the test results data to display a portion of the test results data based a resolution processing path selected from among a plurality of resolution processing paths.

7. The method of claim 1 wherein displaying the at least some of the resolution processing path information for the at least some of the traffic header data includes providing at least one user interface element for selecting a first test message parameter value to display a first resolution processing path for the first test message parameter value.

8. The method of claim 1 wherein the resolution processing path information includes one or more data elements indicating one or more communications protocols, protocol stacks, and/or data layers, wherein the data elements indicate how a test message parameter value is determined.

9. The method of claim 1 wherein the traffic header data includes a source internet protocol (IP) address, a source port information, a source media access control (MAC) address, a destination IP address, a destination port information, a destination MAC address, a protocol identifier, and/or a multi-protocol label switching (MPLS) label.

10. A system for debugging test traffic generation, the system comprising:

at least one processor;
at least one memory; and
a test system implemented using the at least one processor and the at least one memory, wherein the test system is configured for:
generating test traffic, wherein generating the test traffic includes receiving routing information from a system under test (SUT) via at least one routing protocol, determining traffic header data using the routing information, and storing resolution processing path information indicating how the traffic header data was determined; and
displaying, using a display, test traffic data, wherein displaying the test traffic data includes displaying at least some of the resolution processing path information for at least some of the traffic header data.

11. The system of claim 10 wherein the test system is further configured for:
sending the test traffic to the SUT;
receiving the test traffic or related response traffic from the SUT; and
displaying, using the display, test results data.

12. The system of claim 11 wherein the test results data includes test message header parameter values and test message delivery outcomes.

13. The system of claim 11 wherein the test results data includes histogram data indicating distribution of the test traffic along each of a plurality of resolution processing paths for the test traffic.

14. The system of claim 13 wherein the histogram data is represented using a Sankey diagram, a data table, or a visual aid.

15. The system of claim 11 wherein the test system is further configured for:
providing at least one user interface element for filtering the test results data to display a portion of the test results data based a resolution processing path selected from among a plurality of resolution processing paths.

16. The system of claim 10 wherein the test system is further configured for:
providing at least one user interface element for selecting a first test message parameter value to display a first resolution processing path for the first test message parameter value.

17. The system of claim 10 wherein the resolution processing path information includes one or more data elements indicating one or more communications protocols, protocol stacks, and/or data layers, wherein the data elements indicates how a test message parameter value is determined.

18. The system of claim 10 wherein the traffic header data includes a source internet protocol (IP) address, a source port information, a source media access control (MAC) address, a destination IP address, a destination port information, a destination MAC address, a protocol identifier, and/or a multi-protocol label switching (MPLS) label.

19. A non-transitory machine readable storage medium having instructions stored thereon which when executed cause a computing device to perform operations comprising:
at a test system implemented using at least one processor and at least one memory:
generating test traffic, wherein generating the test traffic includes receiving routing information from a system under test (SUT) via at least one routing protocol, determining traffic header data using the routing information, and storing resolution processing path information indicating how the traffic header data was determined; and
displaying, using a display, test traffic data, wherein displaying the test traffic data includes displaying at least some of the resolution processing path information for at least some of the traffic header data.

20. The non-transitory machine readable storage medium of claim 19 having further instructions stored thereon which when executed cause a computing device to perform operations comprising:
sending the test traffic to the SUT;
receiving the test traffic or related response traffic from the SUT; and
displaying, using the display, test results data.

\* \* \* \* \*